United States Patent

Swars et al.

[11] Patent Number: 5,417,062
[45] Date of Patent: May 23, 1995

[54] HEATABLE CATALYTIC CONVERTER CONFIGURATION FOR CLEANING THE EXHAUST GASES OF INTERNAL COMBUSTION ENGINES

[75] Inventors: Helmut Swars; Rolf Brück, both of Bergisch Gladbach, Germany

[73] Assignee: Emitec Gesellschaft fuer Emissionstechnologie mbH, Lohmar, Germany

[21] Appl. No.: 61,170

[22] Filed: May 12, 1993

[30] Foreign Application Priority Data

Nov. 12, 1990 [DE] Germany .................. 40 35 971.9

[51] Int. Cl.$^6$ ................................ F01N 3/28
[52] U.S. Cl. ...................... 60/300; 422/174
[58] Field of Search ............... 60/300; 422/174

[56] References Cited

U.S. PATENT DOCUMENTS

| | | | |
|---|---|---|---|
| 4,928,485 | 5/1990 | Whittenberger | 60/299 |
| 5,106,588 | 4/1992 | Sims | 60/299 |
| 5,140,813 | 8/1992 | Whittenberger | 60/300 |
| 5,146,743 | 9/1992 | Maus | 60/300 |
| 5,229,079 | 7/1993 | Harada | 60/300 |

FOREIGN PATENT DOCUMENTS

| | | | |
|---|---|---|---|
| 2333092 | 1/1975 | Germany | 60/300 |
| 8816514 | 10/1989 | Germany . | |
| 3920159 | 1/1991 | Germany | 60/298 |
| 52-95776 | 3/1979 | Japan . | |
| 8910470 | 11/1989 | WIPO . | |
| 8910471 | 11/1989 | WIPO . | |

*Primary Examiner*—Douglas Hart
*Attorney, Agent, or Firm*—Herbert L. Lerner; Laurence A. Greenberg

[57] ABSTRACT

A catalytic converter configuration for cleaning exhaust gases of internal combustion engines includes at least one first partial catalytic converter, at least one second partial catalytic converter, and an electric heater disposed between the at least one first and the at least one second partial catalytic converters. The at least one first partial catalytic converter has a smaller volume and/or a smaller catalytically active surface area than the at least one second partial catalytic converter.

11 Claims, 1 Drawing Sheet

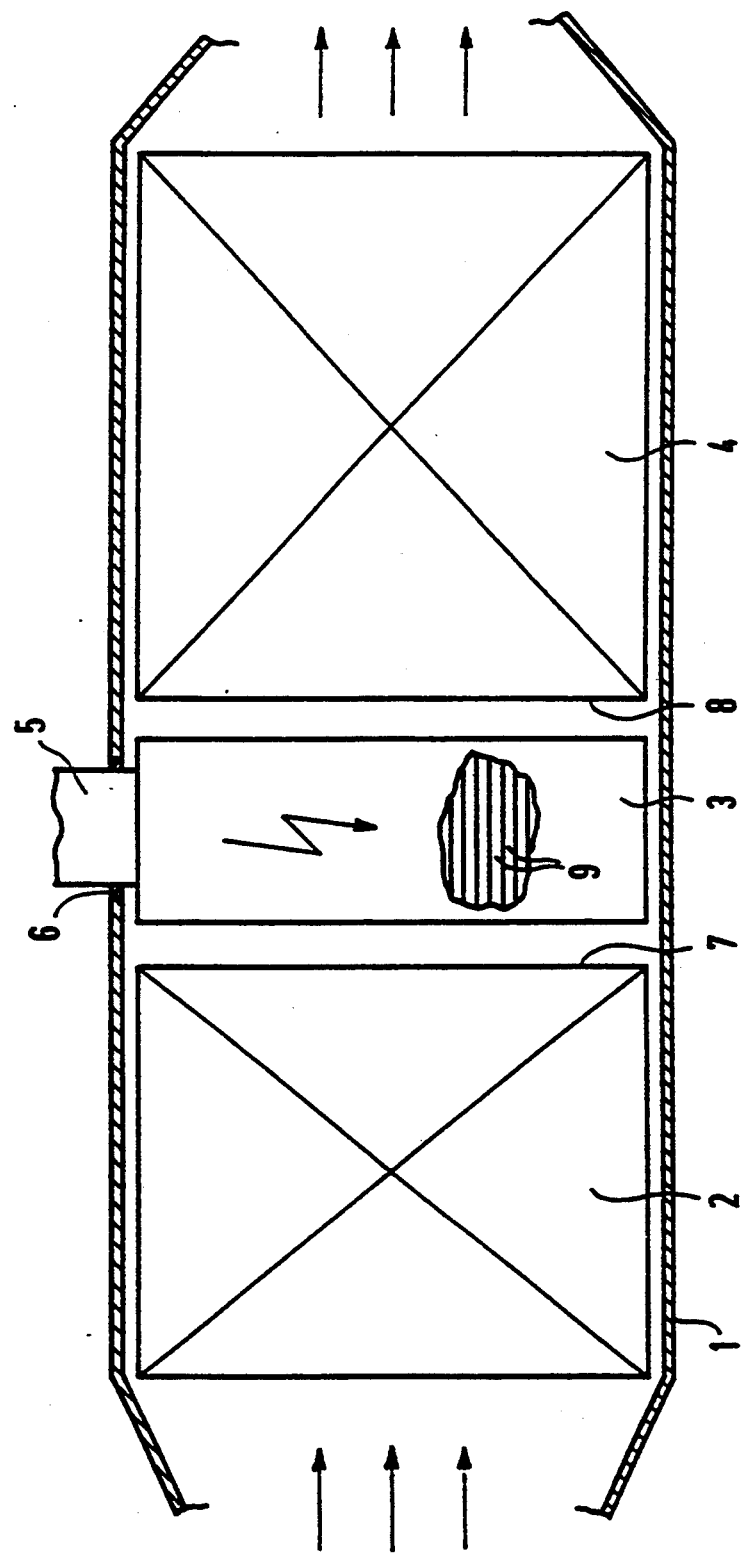

HEATABLE CATALYTIC CONVERTER CONFIGURATION FOR CLEANING THE EXHAUST GASES OF INTERNAL COMBUSTION ENGINES

CROSS-REFERENCE TO RELATED APPLICATION

This application is a Continuation of International Application Ser. No. PCT/EP91/02079, filed Nov. 4, 1991.

SPECIFICATION

The present invention relates to a heatable catalytic converter configuration for cleaning the exhaust gases of internal combustion engines, especially spark ignition engines.

As environmental regulations become increasingly stringent all over the world, more and more vehicles are being equipped with catalytic exhaust gas cleaning systems, and for lowering pollutant emissions in the starting phase, heatable catalytic converter configurations are already known, for instance from Published International Application WO 89/10470, corresponding to U.S. Pat. No. 5,146,743. Suitable electrically conductive honeycomb structures with which such heating can be rapidly carried out are also known from Published International Application WO 89/10471, corresponding to U.S. application Ser. No. 604,199, filed Oct. 25, 1990.

Heretofore, the assumption was that for effective preheating of a catalytic converter configuration for speeding up the onset of the catalytic reactions, the upstream portion of a catalytic converter configuration, or a separate precatalytic converter, had to be heated, since the still-cold exhaust gas strikes those components first. That intrinsically correct concept may nevertheless have various disadvantages in an individual case, depending on existing structural details and other peripheral considerations. For instance, a heated end surface of a catalytic converter configuration, when it is preheated before the engine is started, radiates some of the electrical energy imported into it to components of the piping system in the form of heat radiation. There, the heat is relatively rapidly dissipated to the environment, and therefore is no longer available to preheat the later exhaust gas flow. That increases the amount of electrical energy required for effective preheating. Moreover, it is known that the disk farthest upstream in a catalytic converter configuration is damaged in the course of time by the exhaust gas striking it and by the catalytic reactions that take place in that disk, and is impaired in its catalytic activity. When it is precisely that disk which is electrically heated in order to develop early catalytic activity there, the result over time can be a lessening in the effectiveness of the preheating, because heating is being done to a partial region that is no longer catalytically active. Finally, it is also known that catalyst poisons contained in slight quantities in the exhaust gases settle out precisely in the first partial region of a catalytic converter system and lower the catalytic activity there. For that reason as well, it is not always advantageous to heat precisely the first partial region of a catalytic converter electrically in order to improve the startup performance. It is also already known from German Published, Non-Prosecuted Application DE-OS 23 33 092 to keep a middle part of a low-power catalytic converter configuration at high temperature after the engine has been shut off by heating that part, so that the next time the engine is started the expulsion of emissions will be less. However, the proposed configuration is not suitable for rapid heating because of its high resistance and the attendant low electrical power draw.

It is accordingly an object of the invention to provide a rapidly heatable catalytic converter configuration for cleaning the exhaust gases of internal combustion engines, especially spark ignition engines, which overcomes the hereinafore-mentioned disadvantages of the heretofore-known devices of this general type, in which the electrical energy being used can optionally contribute to speeding up the response of the catalytic converter configuration and in which the startup performance of the catalytic converter configuration degrades as little as possible over the course of a long useful life of the configuration.

With the foregoing and other objects in view there is provided, in accordance with the invention, a catalytic converter configuration for cleaning exhaust gases of internal combustion engines, comprising at least one first partial catalytic converter having a volume dimension and a catalytically active surface area dimension; at least one second partial catalytic converter having a volume dimension and a catalytically active surface area dimension; and an electric heater disposed between the at least one first partial catalytic converter and the at least one second partial catalytic converter; the volume dimension and/or the catalytically active surface area dimension being smaller in the at least one first partial catalytic converter than in the at least one second partial catalytic converter.

In accordance with another feature of the invention, the heater is a directly electrically heatable metal honeycomb structure, preferably having approximately 50 to 200 cpi (cells per square inch, which is the usual unit used for counting the cells or channels per unit of cross-sectional area), and in particular approximately 100 cpi.

Catalysts that are subdivided into a plurality of disks have long been known for motor vehicles and are often used, both for production-related reasons and other reasons. Catalysts with three or more disks are also known, and installing them in a common housing presents no special problems. Therefore, production-dictated difficulties do not arise for the present invention as compared with the prior art. On the other hand, decisive advantages are achieved. Firstly, the heat radiated by the heater in the event of possible preheating without an exhaust gas flow heats substantially the adjacent end surfaces of the partial catalytic converters, so that this radiated heat is jointly available for heating the first exhaust gas flow. Secondly, the first partial catalytic converter protects the heater from catalyst poisons. Finally, the heat produced in the heater is available for the catalytic process in the heater itself or in the second partial catalytic converter and accordingly activates a partial region of the catalytic converter configuration that is only slightly impaired in its catalytic activity even after a relatively long time in operation. Production-related advantages can also be obtained by using the configuration according to the invention, especially if the individual partial catalytic converters are not completely separated from one another but rather cohere in part or are braced against one another.

In accordance with a further feature of the invention, the heater is at least partly provided with a catalytically active coating, preferably a coating having an accelerating effect on the oxidation of exhaust gases. In this way, an especially advantageous utilization of all of the parts is naturally attained.

Although it may suffice for this heater to heat the exhaust gas flow as it begins, so that when this flow strikes the downstream catalytically active surfaces it is at an adequate temperature, nevertheless particularly advantageous conditions are obtained if the electrically heatable honeycomb structure likewise has a catalytically active coating and therefore directly triggers the conversion of the first oncoming exhaust gas.

In order to convert the pollutants in the exhaust gas in the cold-starting phase, it does not matter initially that the first partial catalytic converter is not involved in the catalytic conversion. However, the precondition for this is that the heater and the second partial catalytic converter together furnish sufficient catalytically active surface area for complete conversion. Moreover, the as yet inactive first partial catalytic converter naturally also draws heat from the oncoming exhaust gas at first, and this heat is then not available in the second partial catalytic converter and must be compensated for by sufficient preheating, or optionally post-heating as well, by the electric heater after the engine has been started. It is for these reasons that it may be especially useful for the first partial catalytic converter to have a smaller volume and/or a smaller catalytically active surface area than the second partial catalytic converter. Once the necessary temperature for the catalytic conversion is reached in the first partial catalytic converter, this part then takes on the greater part of the task of conversion, and as a result the heater and the second partial catalytic converter age less and can continue to make their full catalytic activity available for later cold starts.

In accordance with an added feature of the invention, the individual partial catalytic converters may either be typical metal honeycomb structures with a catalytically active coating or typical ceramic honeycomb structures with a catalytically active coating, and even combinations of the two cannot be precluded in principle. It is therefore seen that the catalytic converter configuration according to the invention is not limited to certain types of partial catalytic converters and heaters.

In accordance with an additional feature of the invention, both partial catalytic converters are ceramic honeycomb structures, the heater is retained on its inner end surfaces, and the honeycomb structures themselves are disposed in the usual manner in a common jacket tube. Since ceramic honeycomb structures are electric insulators, this offers a relatively advantageous possibility of retaining heating wires, heating coils, or other metal structures that can be acted upon by high electric currents as heaters, in a simple manner.

In accordance with a concomitant feature of the invention, for effective heating within appropriately short times, the heater has a heating output of from 0.5 to 8 kW, and preferably approximately 3-5 kW. The prerequisite for this, at the voltages typically available in motor vehicles, such as 12 V, is high currents, with appropriate supply lines and line cross sections in the heater. Suitable versions are disclosed in Published International Application WO 89/10471, corresponding to U.S. application Ser. No. 604,199, filed Oct. 25, 1990, for example.

Other features which are considered as characteristic for the invention are set forth in the appended claims.

Although the invention is illustrated and described herein as embodied in a heatable catalytic converter configuration for cleaning the exhaust gases of internal combustion engines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a fragmentary, diagrammatic, longitudinal-sectional view of an exemplary embodiment of the invention, but since a great many ways in which honeycomb structures can be retained in a housing are known in the prior art, a detailed description of this aspect has been dispensed with herein.

Referring now to the single figure of the drawing in detail, there is seen a catalytic converter configuration through which an exhaust gas can flow in the direction of the arrows. Disposed in a housing 1 are a first partial catalytic converter 2, a heater 3, and a second partial catalytic converter 4. The heater 3 includes channels 9 through which exhaust gas can flow and has at least one electrical terminal contact 5, which is extended to the outside through the housing 1 by way of an electrically insulated duct 6. If the housing 1 is not itself constructed as a second electrical terminal contact, then the heater 3 must have a further non-illustrated electrical terminal contact.

If the heater 3 is already heated before the configuration is acted upon by exhaust gas, then some heat is radiated to inner end surfaces 7, 8 of the adjoining partial catalytic converters 2, 4, but is available there after engine starting for heating the still-cold exhaust gas and is not partly lost, as may happen with individual heaters or heaters disposed upstream of a main catalytic converter.

The present invention is suitable for employment not only in combination with ceramic partial catalytic converters, in which case the retention of the heater 3 in an electrically insulating manner between the inner end surfaces 7, 8 of the two partial catalytic converters 2, 4 can be carried out especially advantageously, but also in combination with metal partial catalytic converters, in which case it is particularly simple to install them together in a metal housing. In each case, an effective and long-lived electrically heatable catalytic converter configuration is obtained, which can sharply reduce the expulsion of pollutants in the cold starting phase of an internal combustion engine.

The first partial catalytic converter 2 has a smaller volume and/or a smaller catalytically active surface area than the second partial catalytic converter 4. The first partial catalytic converter 2 and/or the second partial catalytic converter 4 may be a metal honeycomb structure or a ceramic honeycomb structure having a catalytically active coating.

The heater 3 may be a directly electrically heatable metal honeycomb structure. The heater 3 may have a cell count of 50-200 cpi (cells per square inch) and preferably approximately 100 cpi. At least part of the heater 3 has a catalytically active coating, preferably with an accelerating action for the oxidation of exhaust gases. The heater 3 may be retained on the inner end surfaces 7, 8 of the first and second partial catalytic converter 2, 4 which may be ceramic honeycomb structures. The heater 3 may have a heating output of from 0.5 to 8 kW and preferably approximately 3-5 kW.

We claim:

1. A catalytic converter configuration for cleaning exhaust gases of internal combustion engines, comprising:
   a common housing;
   at least one first partial catalytic converter disposed in said common housing and having a volume dimension and a catalytically active surface area dimension;
   at least one second partial catalytic converter disposed in said common housing and having a volume dimension and a catalytically active surface area dimension; and
   an electric heater disposed in said common housing between said at least one first partial catalytic converter and said at least one second partial catalytic converter;
   at least one of said dimensions being smaller in said at least one first partial catalytic converter than in said at least one second partial catalytic converter.

2. The catalytic converter configuration according to claim 1, wherein said heater is a directly electrically heatable metal honeycomb structure.

3. The catalytic converter configuration according to claim 2, wherein said heater has a cell count of 50-200 cells per square inch.

4. The catalytic converter configuration according to claim 2, wherein said heater has a cell count of approximately 100 1 cells per square inch.

5. The catalytic converter configuration according to claim 1, wherein at least part of said heater has a catalytically active coating.

6. The catalytic converter configuration according to claim 1, wherein at least part of said heater has a catalytically active coating with an accelerating action for the oxidation of exhaust gases.

7. The catalytic converter configuration according to claim 1, wherein at least one of said at least one first partial catalytic converter and said at least one second partial catalytic converter is a metal honeycomb structure having a catalytically active coating.

8. The catalytic converter configuration according to claim 1, wherein at least one of said at least one first partial catalytic converter and said at least one second partial catalytic converter is a ceramic honeycomb structure having a catalytically active coating.

9. The catalytic converter configuration according to claim 8, wherein said at least one first partial catalytic converter and said at least one second partial catalytic converter are ceramic honeycomb structures with inner end surfaces, and said heater is retained on said inner end surfaces.

10. The catalytic converter configuration according to claim 1, wherein said heater has a heating output of from 0.5 to 8 kW.

11. The catalytic converter configuration according to claim 1, wherein said heater has a heating output of approximately 3-5 kW.

* * * * *

UNITED STATES PATENT AND TRADEMARK OFFICE
CERTIFICATE OF CORRECTION

PATENT NO. : 5,417,062
DATED : May 23, 1995
INVENTOR(S) : Helmut Swars et al.

It is certified that error appears in the above—identified patent and that said Letters Patent is hereby corrected as shown below:

Column 6

Claim 4, line 3, change "100 1" to -- 100 --;

Signed and Sealed this

Second Day of July, 1996

Attest:

BRUCE LEHMAN

*Attesting Officer*     *Commissioner of Patents and Trademarks*